(No Model.)
A. J. BEACH.
AXLE TRUSS.
No. 296,382. Patented Apr. 8, 1884.
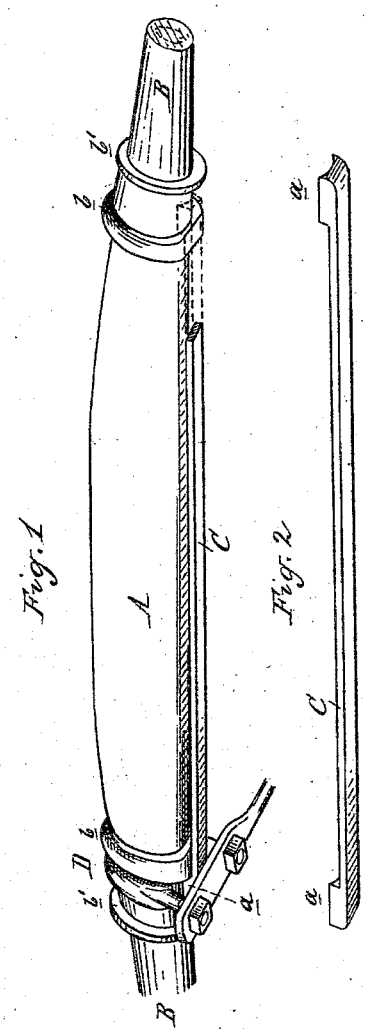
Attest:
A. Barthel
C. J. Hunt
Inventor:
Allen J. Beach
per Thos. S. Sprague
Att'y

UNITED STATES PATENT OFFICE.

ALLEN J. BEACH, OF LINDEN, MICHIGAN.

AXLE-TRUSS.

SPECIFICATION forming part of Letters Patent No. 296,382, dated April 8, 1884.

Application filed December 1, 1881. (No model.)

*To all whom it may concern:*

Be it known that I, ALLEN J. BEACH, of Linden, in the county of Genessee and State of Michigan, have invented an Improvement in Axle-Trusses, of which the following is a specification.

This invention relates to a new and useful improvement in axle-trusses, whereby the axle is allowed to yield slightly, so as to avoid the shocks caused by the rigid trusses heretofore usually employed; and to this end the invention consists in a truss constructed and arranged as hereinafter more particularly described and claimed.

Heretofore various forms of trusses have been employed, most of which have been made of such a character that they were necessarily so rigid that the axle would not yield sufficiently to enable the spokes and fellies to withstand the powerful shocks they were subjected to under a heavy load, and although they served the purpose well for which they were primarily intended—viz., preventing the breaking of the axles—they have proved very objectionable on account of the want of flexibility in the axle trussed in the manner heretofore employed. To overcome this difficulty, I make my truss in such a manner that there is a certain amount of flexibility in the axle when the truss is adjusted in its place, so that the axle may yield as far as necessary to withstand the shocks caused by a heavy superimposed load, and yet be sufficiently rigid to withstand the yielding beyond a point that would injure or fracture the axle under the weight of a heavy load, or cause it to settle, and thereby throw the axles out of position, whereby friction would be increased.

In the accompanying drawings, which form a part of this specification, Figure 1 is a perspective view of an axle provided with my improved truss. Fig. 2 is a perspective of the truss-bar detached.

A represents a wagon-axle, provided upon each end with the skeins B, which are provided with suitable interlocks and bearings to correspond with the truss-bearing.

C represents my improved truss-bar, which is provided with the lugs $a$ upon each end, the faces of which are formed so as to fit snugly against the faces of the skeins B between the two inner flanges, $b\ b'$, the shoulder of such lugs coming in contact with the flange or bead $b$, said truss-bar, when in place, being secured by means of the ordinary clips, D. It will be observed that this truss-bar runs parallel to the under side of the axle, or on a straight line from skein to skein, no matter what the bottom formation of the axle may be. By the use of this truss I provide a means for securely locking the skeins upon the axle-arms, and the axle is strengthened or trussed as against the crushing weight of a superimposed load, while at the same time the axle is free to have a limited amount of spring, but which is arrested by the truss-bar under the effect of a load which would have a tendency to spring the axle beyond a point at which there would be no resistance to the load.

If, as has heretofore been proposed, the truss is made of bars or rods secured underneath the axle by nuts screwed on the threaded ends of said bars or rods, the nuts must necessarily be so tightly screwed that there can be no flexibility in the axle when trussed, and the consequence is that wagons having such trussed axles soon have their fellies crushed at the point where they rest on the spokes by the pounding to which they are subjected. If an attempt is made to unscrew the nuts of such trusses a little, so as to give the necessary flexibility in the axle, the nuts so unscrewed would soon become loose from the constant jarring they would receive when in use, and thus there would soon be practically no truss, and as soon as the axle was overborne the wagon would settle or the axle would be broken. Moreover, with such trusses there is no means of accurately gaging the amount of tension in the truss, and it is necessarily the practice to screw such trusses as tight as they can be well screwed, and hence there is nothing but the sense of feeling to tell whether the right tension is on the truss or not; and even admitting that the right amount of tension is put on the truss at first, there is no certainty of its remaining in that condition, as it is likely to be changed at any time by meddlesome, mischievous boys or ignorant men. With my invention, on the contrary, the tension of the truss is always a fixed quantity and cannot vary, for all that is necessary to get with certainty the exact amount of flexibility to the axle or tension in the truss is to make the axle, skeins, and truss of certain proportions, and when the truss is put in place and secured by the clips the axle has just the right amount of flexibility to allow it to yield as far as necessary without the truss taking any part of the work until the load has become so great as to cause the axle to be overborne, when the truss takes the load and prevents the axle from settling. Under this arrangement it is obvious that the desired amount of tension may be given to a truss every time without fail, and that an axle and its truss may be separated at any time, and will go together again with precisely the same amount of tension in the truss and of flexibility in the axle as before.

I am aware of the Patent No. 191,679, in which there is a flat bar held on by clips; but the truss-bar (if such it can be called) has an angle near each end, which under strain would pull out or straighten, and thus as it becomes longer would have little or no effect in strengthening the axle.

What I claim as new is—

The straight truss-bar C, having solid ends $a\ a$, with faces corresponding to the surface of the skeins, combined with the skeins B, having flanges $b$, and with the securing-clips D, whereby the truss-bar extends in substantially a straight line from skein to skein, so as to give the axle a limited amount of spring, and yet arrest the movement of the same under unusual strain, substantially as described.

ALLEN J. BEACH.

Witnesses:
H. S. SPRAGUE,
CHAS. J. HUNT.